(12) United States Patent
Liu

(10) Patent No.: US 8,740,301 B2
(45) Date of Patent: Jun. 3, 2014

(54) VEHICLE SEAT HEADREST WITH BUILT-IN COMMUNICATION TOOL

(76) Inventor: Calvin Liu, City of Industry, CA (US)

( * ) Notice: Subject to any disclaimer, the term of this patent is extended or adjusted under 35 U.S.C. 154(b) by 283 days.

(21) Appl. No.: 12/924,949

(22) Filed: Oct. 8, 2010

(65) Prior Publication Data

US 2012/0086247 A1 Apr. 12, 2012

(51) Int. Cl.
*A47C 7/62* (2006.01)
(52) U.S. Cl.
USPC ..................... 297/217.3; 297/217.1
(58) Field of Classification Search
USPC .......................................... 297/217.3, 217.1
See application file for complete search history.

(56) References Cited

U.S. PATENT DOCUMENTS

| | | | | |
|---|---|---|---|---|
| 7,597,393 B1 * | 10/2009 | Tuccinardi et al. | ........ | 297/217.3 |
| 8,141,948 B2 * | 3/2012 | Cassellia et al. | ........... | 297/217.3 |
| 8,201,203 B2 * | 6/2012 | Vitito | .............................. | 725/75 |
| 2008/0252118 A1 * | 10/2008 | Chang | ......................... | 297/217.3 |
| 2008/0272634 A1 * | 11/2008 | Vasquez et al. | ............ | 297/217.4 |
| 2009/0278390 A1 * | 11/2009 | Carter | ........................ | 297/217.4 |
| 2011/0174926 A1 * | 7/2011 | Margis et al. | .............. | 244/118.6 |

* cited by examiner

*Primary Examiner* — Sarah B McPartlin
(74) *Attorney, Agent, or Firm* — Marc E. Hankin; Kevin Schraven; Jimmy Sauz

(57) ABSTRACT

A headrest for mounting on a vehicle seat of a vehicle includes a head pillow and an entertainment system. The entertainment system includes a display screen and a communication tool. The communication tool is electrically connected with the display screen, and is arranged to electrically communicate with an external electronic device in such a manner that the communication tool is arranged to electrically link the display screen with the external electronic appliance for establishing an interaction between the display screen and the external electronic appliance, such that a user is able to operate and control the external electronic appliance on the display screen through the communication tool.

2 Claims, 5 Drawing Sheets

VEHICLE SEAT HEADREST WITH BUILT-IN COMMUNICATION TOOL

BACKGROUND OF THE PRESENT INVENTION

1. Field of Invention

The present invention relates to a headrest, and more particularly to a headrest for use in a vehicle and comprises an entertainment system which is arranged to electrically link to an external electronic appliance so that a user is capable of operating the external electronic appliance through the entertainment system or vice versa.

2. Description of Related Arts

A conventional vehicle, such as a car, has a car seat headrest installed on the car seat. A conventional headrest for a car seat usually comprises a head pillow and two parallel supporting rods downwardly extended from the head pillow to slidably engage with two retention slots of the car seat. Usually, the distance between the two supporting rods of the head rest must match with a distance between the two retention slots of the car seat.

In addition, most cars are modified to build a LCD screen at the rear side of the head rest for entertainment purpose. However, since most LCD screen is pre-installed into the headrest of the car seat, its functions are fairly limited. For example, a built-in LCD screen may only display certain multimedia materials, such as movies, retrieved from predetermined multimedia players, such as a built-in DVD player, or a portable DVD player. Other than playing movies or videos, the LCD screen mentioned above has little function.

One disadvantage of this existing vehicle head rests is that the LCD screen is inadequate to accommodate current entertainment or multimedia needs. More specifically, most people now have at least one portable communication or information processing device. For example, almost every person has at least one cellular phone and many people have laptop computers. When they are sitting in a car as passengers, the existing LCD displays for displaying movies simply cannot suit their need. Those passengers may want to utilize the LCD displays to perform more tasks than just simply watching movies.

Furthermore, the users of the LCD screens may want to utilize them for displaying what they are doing with their personal electronic communication devices. For example, when a passenger wants to share a particular photo stored in his laptop computer with other passengers, he may want to link his laptop computer with the LCD screens built-in in the car so that every passenger sitting in the car can observe the photo simply by looking at the LCD screens positioned in front of them. Conventional LCD screens for car seat headrests fail to perform such function.

SUMMARY OF THE PRESENT INVENTION

The invention is advantageous in that it provides a headrest for use in a vehicle and comprises an entertainment system which is arranged to electrically link to an external electronic appliance so that a user is capable of operating the external electronic appliance through the entertainment system or vice versa.

Another advantage of the invention is to provide a headrest comprising an entertainment system that is capable of electrically connecting with a wide variety of external multimedia or electronic devices so as to allow users of the present invention to operate their own multimedia or electronic devices with the help of the display screen provided on the headrest.

Another advantage of the invention is to provide a headrest comprising an entertainment system that can connect to a wide variety of multimedia or electronic devices in a wireless or wired manner.

Additional advantages and features of the invention will become apparent from the description which follows, and may be realized by means of the instrumentalities and combinations particular point out in the appended claims.

According to the present invention, the foregoing and other objects and advantages are attained by providing a headrest for mounting on a vehicle seat of a vehicle, comprising:

a head pillow, which comprises:

a pillow body having a receiving cavity formed at a rear side of the pillow body; and a mounting arrangement extended from the pillow body for mounting the head pillow to the vehicle seat; and an entertainment system, comprising:

at least one display screen detachably mounted at the rear side of the pillow body within the receiving cavity; and a communication tool electrically connected with the display screen, and is arranged to electrically communicate with an external electronic appliance in such a manner that the communication tool is arranged to electrically link the display screen with the external electronic appliance for establishing an interaction between the display screen and the external electronic appliance, such that a user is able to operate and control the external electronic appliance on the display screen through the communication tool.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
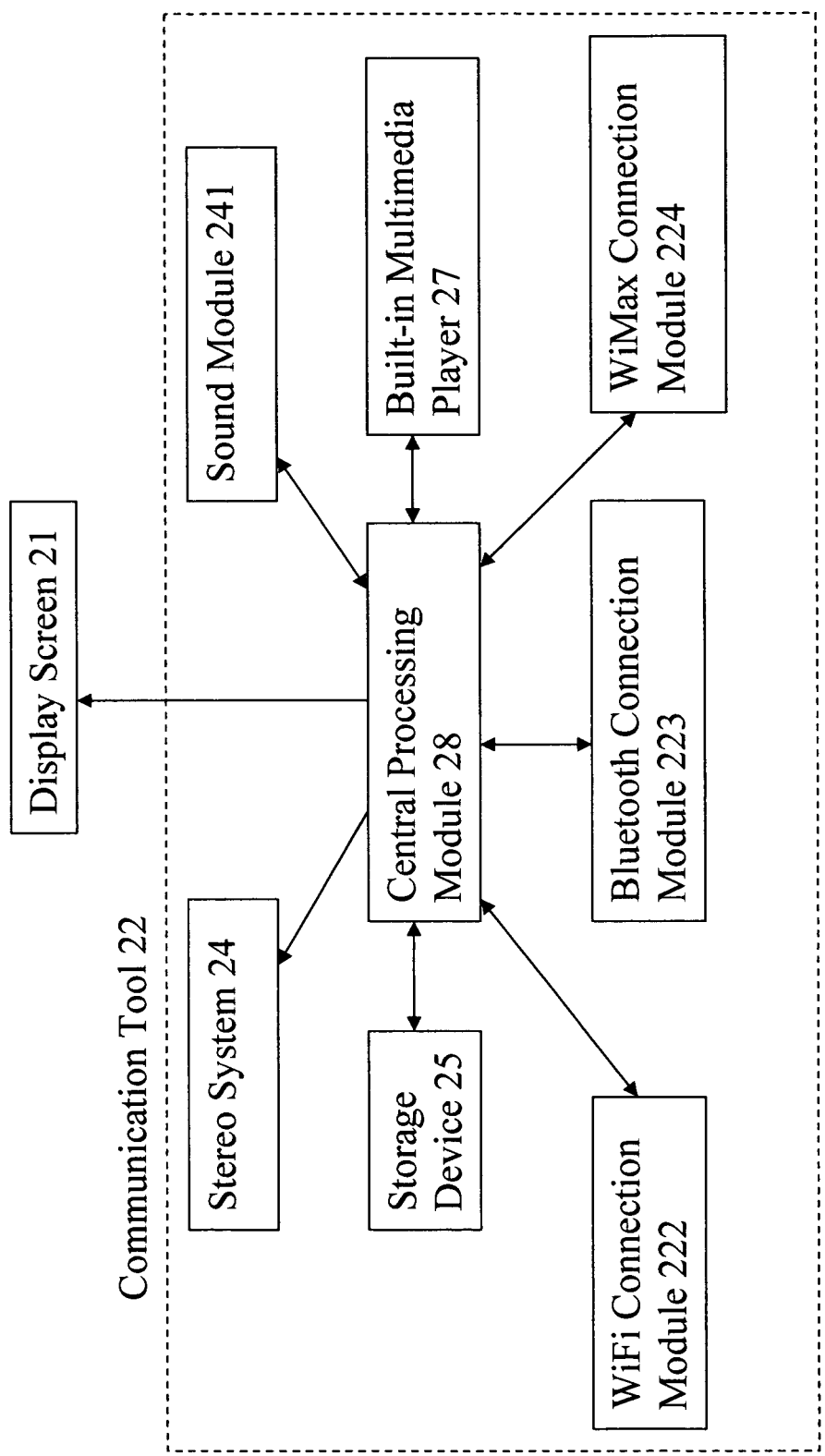
FIG. 1 is a block diagram of the headrest according to the above preferred embodiment of the present invention.
Figure 2A:
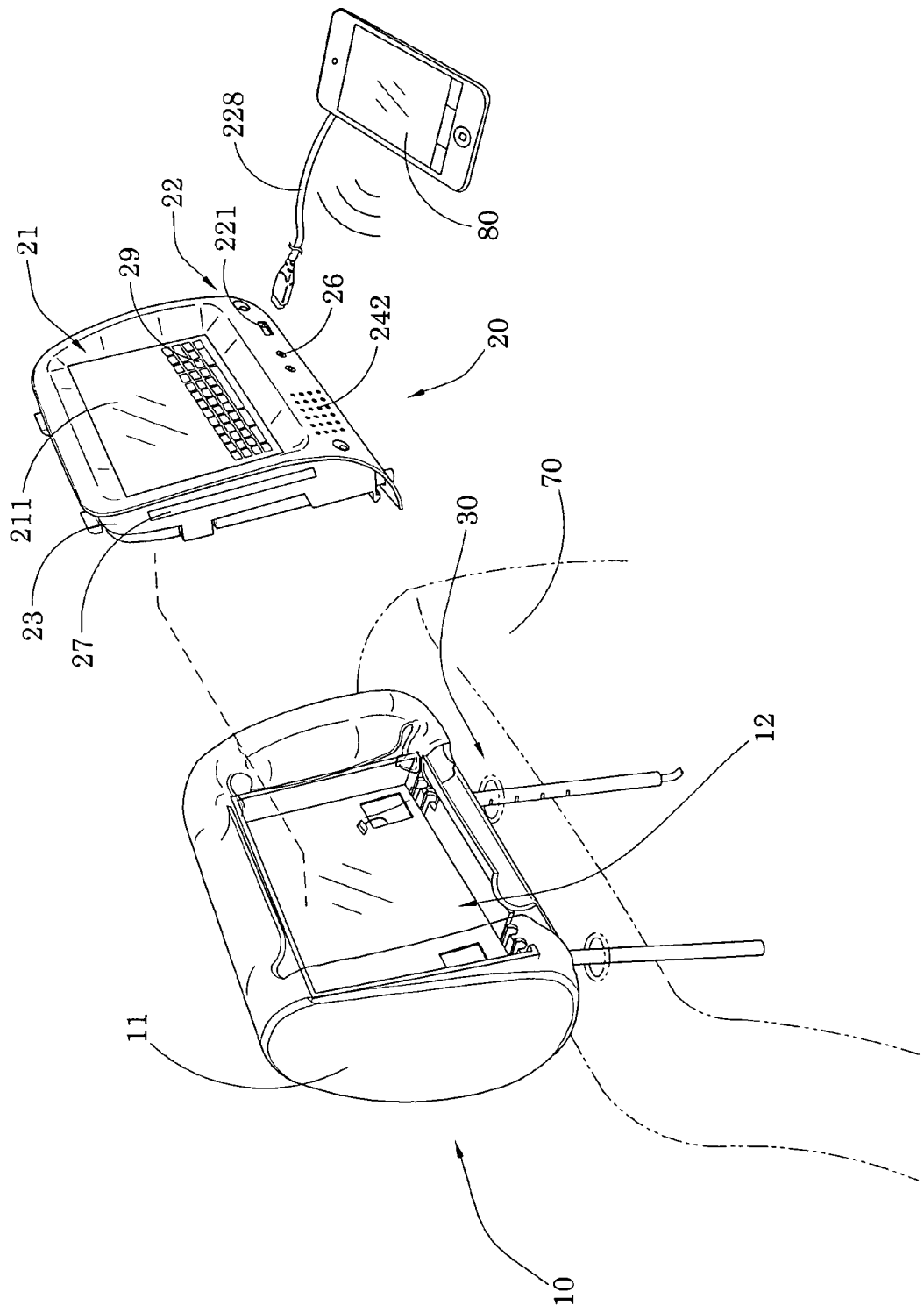
FIG. 2A to FIG. 2D are schematic diagrams of the entertainment system of the headrest according to the above preferred embodiment of the present invention.
Figure 2B:
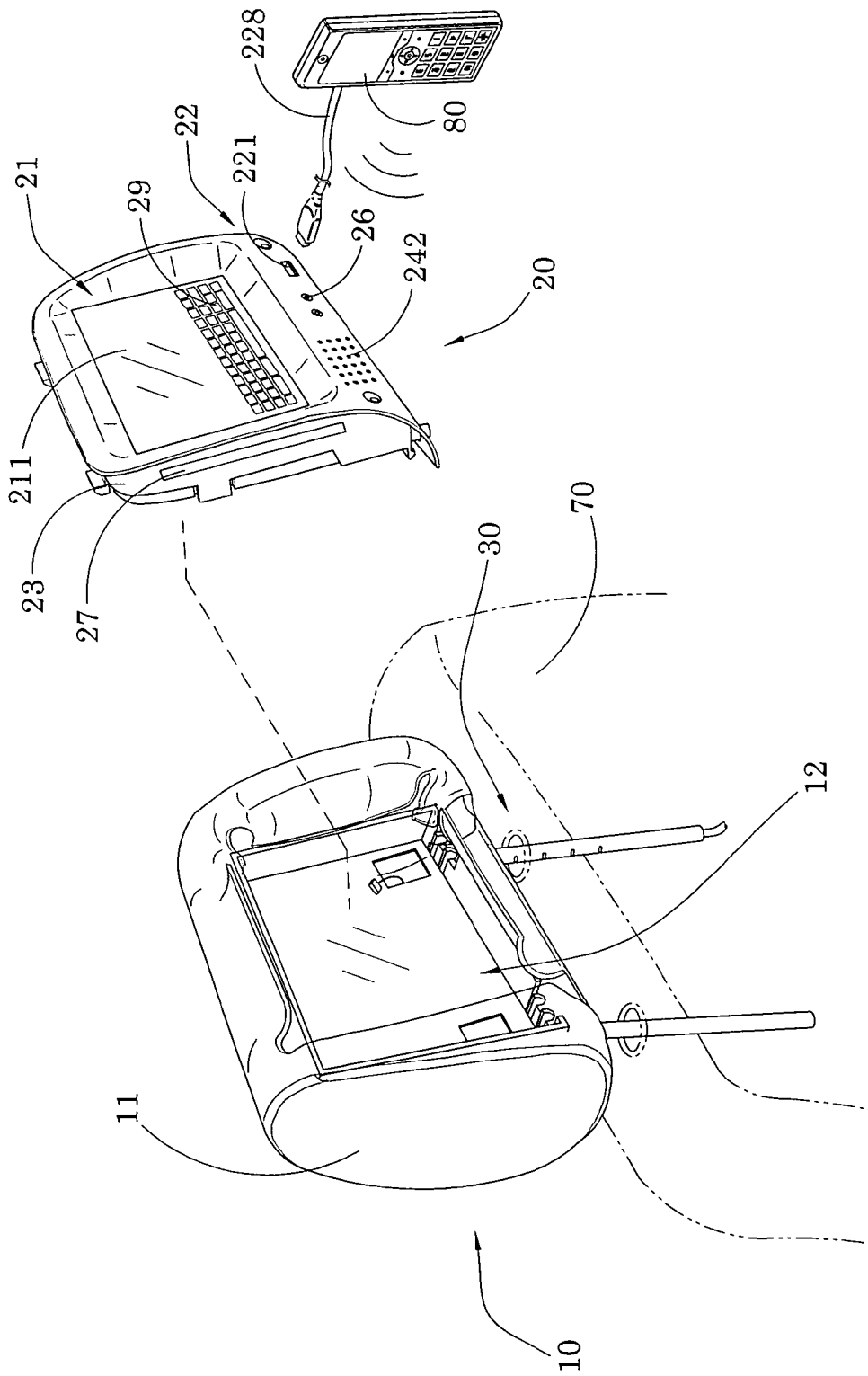
Figure 2C:
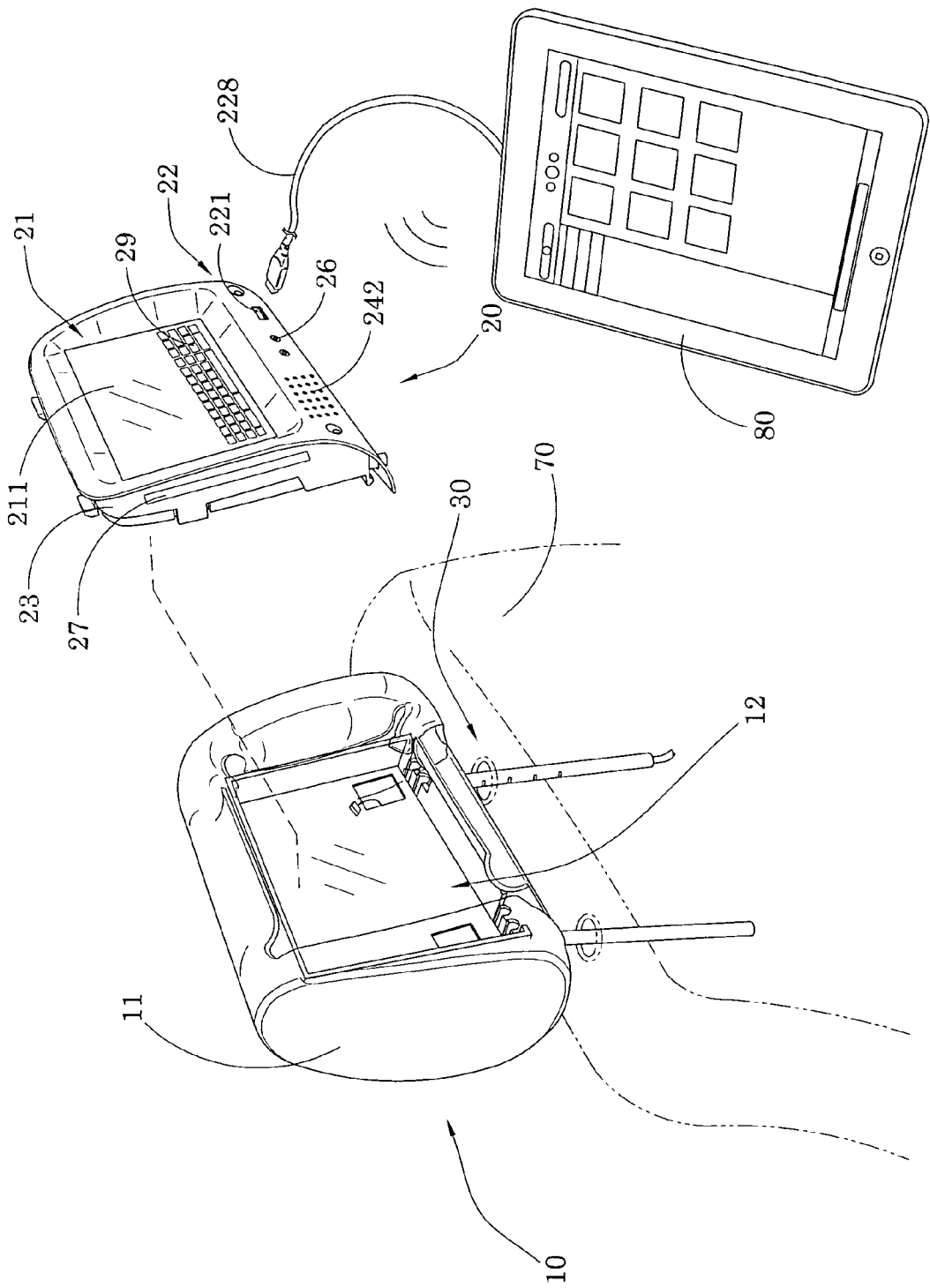
Figure 2D:
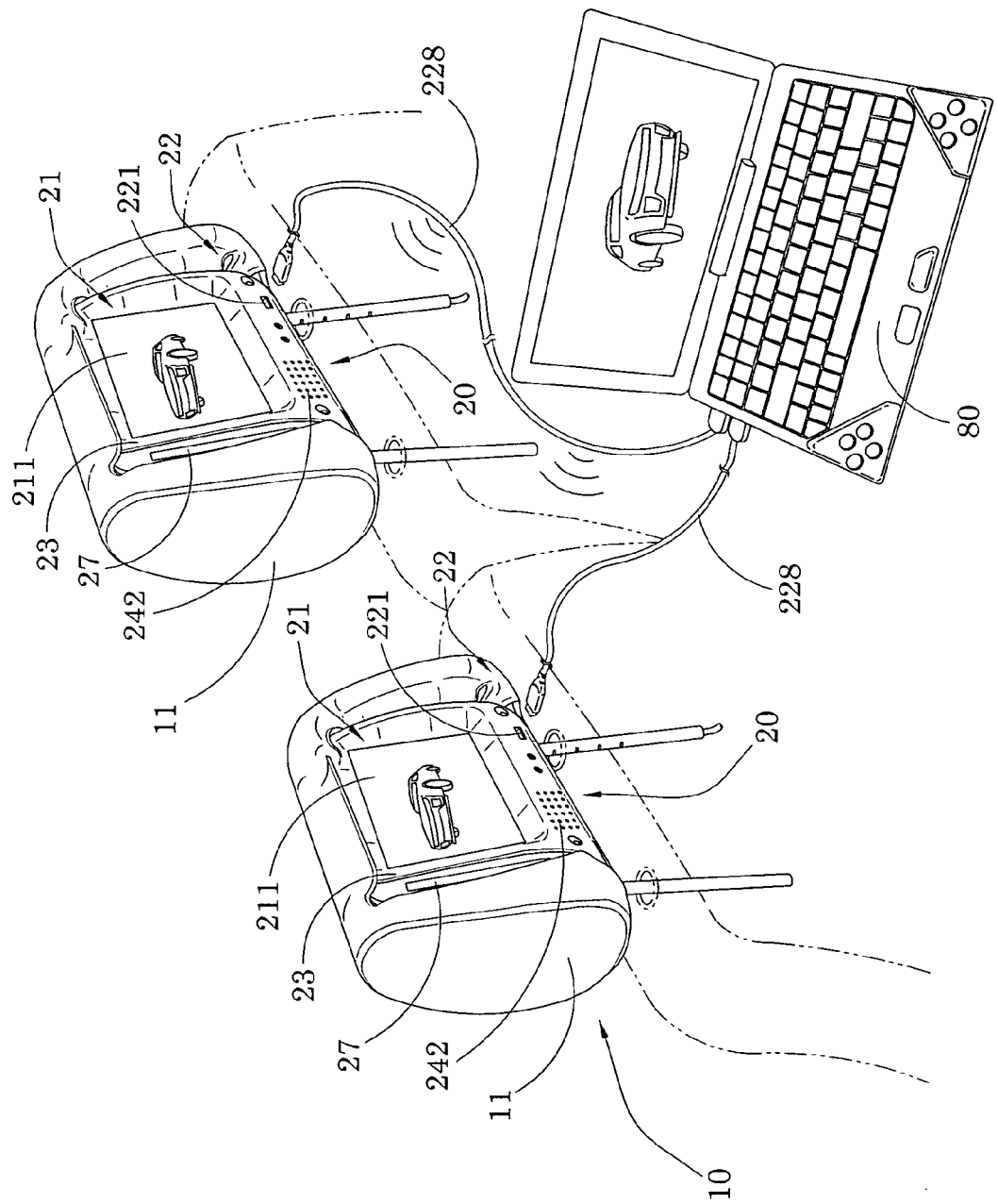

Referring to a FIG. 1 and FIG. 2A to FIG. 2D of the drawings, a headrest for mounting on a vehicle seat 70 according to a preferred embodiment of the present invention is illustrated, in which the headrest comprises a head pillow 10, and an entertainment system 20.

The head pillow 10 comprises a pillow body 11 having a receiving cavity 12 formed at a rear side of the pillow body 11, and a mounting arrangement 30 extended from the pillow body 11 for mounting the head pillow 10 to the vehicle seat 70.

On the other hand, the entertainment system 20 comprises at least one display screen 21 and a communication tool 22. The display screen 21 is detachably mounted at the rear side of the pillow body 11 within the receiving cavity 12.

The communication tool 22 is electrically connected with the display screen 21, and is arranged to electrically communicate with an external electronic device 80 in such a manner that the communication tool 22 is arranged to electrically link the display screen 21 with the external electronic device 80 for establishing an interaction between the display screen 21 and the external electronic device 80, such that a user is able to operate and control the external electronic device 80 on the display screen 21 through the communication tool 22.

According to the preferred embodiment of the present invention, the head pillow 10 is mounted onto the headrest portion of the vehicle seat 70 on a rear side thereof for displaying image to the passenger sitting behind the vehicle seat 70 on which the entertainment system 20 is mounted. In other words, the user who actually accesses or watches the multimedia materials on the display screen 21 is the one who sits behind the vehicle seat 70.

The entertainment system 20 comprises a housing 23 whereas the display screen 21 comprises a LCD panel 211 having a LED backlit background and a touch-screen feature which fully supports operation by physical touching of the user of the present invention. In other words, the user is able to control both the entertainment system 20 and the external electronic device 80 by simply touching predetermined positions on the LCD panel 211. The LCD panel 211 is mounted onto the housing 23 which is then mounted onto the rear side of the pillow body 11 of the head pillow 10. Moreover, the communication tool 22 is also supported on the housing 23 for communicating with the user of the present invention.

The entertainment system 20 further comprises a stereo system 24 provided on the housing 23, wherein the stereo system 24 comprises a sound module 241 received in the housing 23, and a plurality of stereo speakers 242 also provided on the housing 23 for generating audible sound to an exterior thereof.

The entertainment system 20 further comprises a storage device 25 preferably received in the housing 23, wherein the storage device 25 has a predetermined amount of storage capacity for storing multimedia materials. The storage device 25 is preferably embodied as a flash memory hard drive which may store a predetermined amount of movie and/or music files. The movies or music files are then played on the display screen 21.

The entertainment system 20 further comprises a microphone 26 provided on the housing 23 for allowing users of the present invention to input sound signal to the entertainment system 20. For example, the microphone 26 may be used to allow the user to enjoy karaoke while traveling. The user's voice will then be delivered to other passengers through the stereo system 24.

The entertainment system 20 further comprises a built-in multimedia player 27 provided on the housing 23 for processing multimedia materials and playing the multimedia materials on the display screen 21. The multimedia player 27 is preferably embodied as a DVD player. However, player for other types of multimedia materials, such as MP3 or CDs, are also possible alternatives or additions to the DVD player. In other words, the built-in multimedia player 27 is capable if playing at least one common multimedia materials (such as movie files stored in DVDs), but the multimedia player 27 can be embodied as having the capability to play more than one type of multimedia materials, such as music files in CDs.

The communication tool 22 comprises at least one USB connection port 221 provided on the housing 23 and/or on the display screen 21 for allowing the user of the present invention to connect his or her external electronic device 80 with the entertainment system 20 through the USB connection port 221. Thus, the user of the present invention may bring his or her own external electronic device 80 to the vehicle, such as an external hard drive containing movies or music files, and connect the external hard drive to the entertainment system 20 through the USB connection port 221 and a USB 228 cable so as to allow the display screen 21 and the stereo system 24 to play the multimedia materials contained in the external electronic device 80.

The communication tool 22 further comprises a WiFi connection module 222 provided in the housing 23, wherein the WiFi connection module 222 is arranged to wirelessly connect to an external WiFi network. When the entertainment system 20 is connected to a WiFi network through the WiFi connection module 222, the user is able to access to Internet via the entertainment system 20.

The communication tool 22 further comprises a Bluetooth connection module 223 also provided in the housing 23, wherein the Bluetooth connection module 223 is arranged to wirelessly connect to the external electronic device 80 through Bluetooth technology. The entertainment system 20 and the external electronic device 80 will then be able to exchange information in a wireless manner through Bluetooth connection technology.

Furthermore, the communication tool 22 further a WiMax connection module 224 also provided in the housing 23, wherein the WiMax connection module 224 is arranged to wirelessly connect to the Internet network through a predetermined telecommunication protocol. The entertainment system 20 will then be able to gain mobile Internet access through the WiMax connection module 224.

Moreover, the entertainment system 20 further comprises a central processing module 28 provided in the housing 23 and electrically connected to the communication tool 22, the stereo system 24, the storage device 25, the microphone 26 and the multimedia player 27 to control and coordinate the operation of each of these components. In addition, in order to facilitate control and interaction of the entertainment system and the external electronic device 80, the entertainment system 20 further comprises a control panel 29 electrically connected with the central processing module 28 for control of the various components mentioned above and to provide a platform for allowing the user to interact with the external electronic device 80. The control panel 29 can be a physical control panel separately extended from the housing 23. On the other hand, the control panel 29 may be incorporated into the LCD panel 211 so that the touch-screen feature of the LCD panel 211 can be used by the user for making inputting commands to control the entertainment system 20 or the external electronic device 80. Alternatively, the user may control the operation of the external electronic device 80 through its own control panel.

The operation of the present invention can be elaborated under the following examples by illustrating the use of different external electronic device 80 and by referring to FIG. 2A to FIG. 2D.

Example 1

In this example (FIG. 2A), the user of the present invention can connect the external electronic device 80, such as an iPod Touch, or other media player with music, image and video files and stream the content wirelessly to the entertainment system 20 via the communication tool 22 (i.e. the Bluetooth connection module 221 or the USB connection port 221). The playback control of the multimedia material is accomplished through the touch screen of the display screen 21, so that the external electronic device 80 can remain in the user's pocket.

Example 2

In this example (FIG. 2B), the user of the present invention can connect the external electronic device 80, such as a smart phone to the entertainment system 20 via the Bluetooth connection module 221 so that incoming or outgoing calls can be placed through the entertainment system 20. The user may make the calls by touching the LCD panel 211 of the display screen 21. Moreover, the user may achieve conversation with the other party by speaking through the microphone 26 and listening to the conversation of the other party through the stereo system 24.

In this particular example, the calling control is accomplished through the LCD panel 211 (which has a touch-screen feature) so that the smart phone can be kept in user's pocket. This provides great convenience to the user of the present invention. Furthermore, the information displayed on the smart phone may be transferred to the LCD panel 211 so that the user is able to access the display of the smart phone by simply looking at the LCD panel 211. For example, emails or text messages can be displayed on the LCD panel 211, which also provides control panel for controlling an operation of the smart phone.

Example 3

In this particular example (FIG. 2C), the external electronic device 80 is an iPad or other tablet computers so that the user may interact with the iPad or other tablet computers through the entertainment system 20. Moreover, the display screen 21 can act as a second screen for some iPad applications, such as gaming.

Example 4

In this example (FIG. 2D), the external electronic device 80 is preferably a laptop computer. The user may connect the laptop computer to the entertainment system 20 via Bluetooth module 223 or the USB connection port 221. After connection, the user of the present invention may perform a number of applications, such as presentation. For example, the user may transfer presentation files and information to the entertainment system 20 which then display the presentation information on the display screen 21. Moreover, several entertainment systems 20 of several headrests may be linked together though the communication tool 22 so that a single laptop computer may provide presentation material to many display screens 21 in the vehicle. Thus, the user may publish information stored in his or her laptop computer to many different people through the entertainment system 20 while traveling.

It is worth mentioning that the vehicle may be equipped with a plurality of headrests of the present invention, while the entertainment systems 20 of the headrests are wirelessly linked together by the communication tool 22 so that when one of the headrests receives information contained in the external electronic device 80, other entertainment systems 20 of other headrests in the same vehicle may receive the information through communication among different entertainment systems 20. Moreover, each of the entertainment systems 20 may also control the external electronic device 80 through the control panel 29. Moreover, a single laptop may be connected with a plurality of headrests.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A system of one or more headrests for mounting on one or more vehicle seats of a vehicle, comprising:
one or more head pillows, wherein said one or more head pillows comprise:
a pillow body having a receiving cavity formed at a rear side of said pillow body; and
a mounting arrangement extended from said pillow body for mounting said head pillow to said vehicle seat; and
an entertainment system, comprising:
at least one display screen detachably mounted at said rear side of said pillow body within said receiving cavity; and
a communication tool electrically connected with said display screen, and is arranged to electrically communicate with an external electronic device in such a manner that said communication tool is arranged to electrically link said display screen with said external electronic device for establishing an interaction between said display screen and said external electronic device;
wherein said entertainment system forms both a control for operating and controlling said external electronic device and a display means for being operated and controlled by said external electronic device to display multimedia materials therefrom through said communication tool;
wherein said entertainment system comprises a housing, wherein said display screen comprises a LCD panel, which is mounted on said housing and has a LED backlit background and a touch-screen;
wherein said display screen forms a touch control for operating and controlling said external electronic device and provides a display for displaying the multimedia materials from said external electronic device on said display screen so that said user is able to control said entertainment system and said external electronic device by simply touching predetermined positions on said LCD panel;
wherein said communication tool comprises at least one USB connection port provided on said housing for providing a port to facilitate connection between said external electronic device and said entertainment system in order to establish the interaction therebetween;
wherein said communication tool further comprises a WiFi connection module provided in said housing;
wherein said WiFi connection module is arranged to wirelessly connect to an external WiFi network, such that when said entertainment system is connected to a WiFi network through said WiFi connection module, said user is able to access to Internet via said entertainment system;
wherein said communication tool further comprises a Bluetooth connection module provided in said housing;
wherein said Bluetooth connection module is arranged to wirelessly connect to said external electronic device through Bluetooth technology, so that said entertainment system and said external electronic device are able to exchange information in a wireless manner through Bluetooth connection technology;
wherein said communication tool further comprises a WiMax connection module provided in said housing;
wherein said WiMax connection module is arranged to wirelessly connect to an Internet network through a predetermined telecommunication protocol, so that said entertainment system is able to gain mobile Internet access through said WiMax connection module; and wherein two or more of said entertainment systems are wirelessly linked to each other so that when one of said two or more entertainment systems receives information contained in said external electronic device, the rest of said two or more entertainment systems receive said information through said communication tool.

2. A system of headrests for mounting on one or more vehicle seats of a vehicle, comprising:

one or more head pillows, wherein said one or more head pillows comprise:
  a pillow body having a receiving cavity formed at a rear side of said pillow body; and
  a mounting arrangement extended from said pillow body for mounting said head pillow to said vehicle seat; and an entertainment system, comprising:

at least one display screen detachably mounted at said rear side of said pillow body within said receiving cavity; and a communication tool electrically connected with said display screen, and is arranged to electrically communicate with an external electronic device in such a manner that said communication tool is arranged to electrically link said display screen with said external electronic device for establishing an interaction between said display screen and said external electronic device;

wherein said entertainment system forms both a control for operating and controlling said external electronic device and a display means for being operated and controlled by said external electronic device to display multimedia materials therefrom through said communication tool;

wherein said entertainment system comprises a housing, wherein said display screen comprises a LCD panel which is mounted on said housing and has a LED backlit background and a touch-screen;

wherein said display screen forms a touch control for operating and controlling said external electronic device and provides a display for displaying the multimedia materials from said external electronic device on said display screen so that said user is able to control said entertainment system and said external electronic device by simply touching predetermined positions on said LCD panel;

wherein said communication tool comprises at least one USB connection port provided on said housing for providing a port to facilitate connection between said external electronic device and said entertainment system in order to establish the interaction therebetween;

wherein said communication tool further comprises a WiFi connection module provided in said housing;

wherein said WiFi connection module is arranged to wirelessly connect to an external WiFi network, such that when said entertainment system is connected to a WiFi network through said WiFi connection module, said user is able to access to Internet via said entertainment system;

wherein said communication tool further comprises a Bluetooth connection module provided in said housing;

wherein said Bluetooth connection module is arranged to wirelessly connect to said external electronic device through Bluetooth technology, so that said entertainment system and said external electronic device are able to exchange information in a wireless manner through Bluetooth connection technology;

wherein said communication tool further comprises a WiMax connection module provided in said housing;

wherein said WiMax connection module is arranged to wirelessly connect to an Internet network through a predetermined telecommunication protocol, so that said entertainment system is able to gain mobile Internet access through said WiMax connection module;

wherein said entertainment system further comprises a stereo system provided on said housing;

wherein said stereo system comprises a sound module received in said housing, and at least one stereo speaker provided on said housing for generating audible sound;

wherein said entertainment system further comprises a storage device received in said housing;

wherein said storage device has a predetermined amount of storage capacity for storing multimedia materials from said external electronic device through said communication tool;

wherein said entertainment system further comprises a microphone provided on said housing for allowing said user to input sound signal to said entertainment system;

wherein said entertainment system further comprises a built-in multimedia player provided on said housing for processing multimedia material and playing said multimedia material on said display screen;

wherein said entertainment system further comprises a central processing module provided in said housing and electrically connected to said communication tool, said stereo system, said storage device, said microphone and said multimedia player to control and coordinate an operation of each of said communication tool, said stereo system, said storage device, said microphone and said multimedia player;

wherein said entertainment system further comprises a control panel electrically connected with said central processing module for control of said communication tool, said stereo system, said storage device, said microphone and said multimedia player and to provide a platform for allowing said user to interact with said external electronic device;

wherein said control panel is incorporated into said LCD panel so that said touch-screen function of said LCD panel is capable of being used by said user for making inputting commands to control said entertainment system, said communication tool and said external electronic device; and wherein two or more of said entertainment systems are wirelessly linked to each other so that when one of said two or more entertainment systems receives information contained in said external electronic device, the rest of said two or more entertainment systems receive said information through said communication tool.

* * * * *